(12) United States Patent
Hartwig et al.

(10) Patent No.: US 9,411,153 B2
(45) Date of Patent: Aug. 9, 2016

(54) PHOSPHOR WHEEL AND ILLUMINATION DEVICE COMPRISING THIS PHOSPHOR WHEEL AND A PUMP LIGHT SOURCE

(71) Applicant: OSRAM GMBH, Munich (DE)

(72) Inventors: Ulrich Hartwig, Berlin (DE); Martin Daniels, Berlin (DE)

(73) Assignee: OSRAM GmbH, Munich (DE)

( * ) Notice: Subject to any disclaimer, the term of this patent is extended or adjusted under 35 U.S.C. 154(b) by 135 days.

(21) Appl. No.: 14/260,165

(22) Filed: Apr. 23, 2014

(65) Prior Publication Data

US 2014/0333901 A1 Nov. 13, 2014

(30) Foreign Application Priority Data

May 8, 2013 (DE) .................. 10 2013 208 549

(51) Int. Cl.
| | |
|---|---|
| G02B 26/00 | (2006.01) |
| F21V 14/08 | (2006.01) |
| G03B 21/14 | (2006.01) |
| G03B 21/20 | (2006.01) |
| G03B 33/08 | (2006.01) |
| H04N 9/31 | (2006.01) |

(52) U.S. Cl.
CPC ............. *G02B 26/008* (2013.01); *F21V 14/08* (2013.01); *G03B 21/142* (2013.01); *G03B 21/204* (2013.01); *G03B 33/08* (2013.01); *H04N 9/3158* (2013.01)

(58) Field of Classification Search
CPC .......................... G03B 21/204; G03B 21/2033
See application file for complete search history.

(56) References Cited

U.S. PATENT DOCUMENTS

| | | | | |
|---|---|---|---|---|
| 2010/0245777 | A1 | 9/2010 | Ogura | |
| 2011/0116253 | A1* | 5/2011 | Sugiyama | F21S 10/007 362/84 |
| 2012/0106126 | A1* | 5/2012 | Nojima | G02B 26/008 362/84 |
| 2013/0002972 | A1* | 1/2013 | Tanaka | G02B 27/1046 349/8 |
| 2013/0050654 | A1* | 2/2013 | Hu | G03B 33/06 353/31 |
| 2013/0100417 | A1* | 4/2013 | Yang | G03B 21/204 353/31 |
| 2013/0329421 | A1* | 12/2013 | Finsterbusch | G02B 23/2469 362/231 |

* cited by examiner

*Primary Examiner* — Sultan Chowdhury
(74) *Attorney, Agent, or Firm* — Cozen O'Connor

(57) ABSTRACT

The invention provides an illumination device comprising a pump light source and a phosphor wheel. The phosphor wheel comprises at least two segmented phosphor layers. The front surfaces of the phosphor layers do not form a common plane, but instead a kind of relief in which the surfaces of the phosphor layers extend in different imaginary planes. When the phosphor wheel rotates through a beam waist of the pump. light, in this way the size of the pump light spot and therefore also the power density distribution of the pump light on the respective phosphor layer are adapted.

21 Claims, 6 Drawing Sheets

PHOSPHOR WHEEL AND ILLUMINATION DEVICE COMPRISING THIS PHOSPHOR WHEEL AND A PUMP LIGHT SOURCE

RELATED APPLICATION

This application claims the priority of German application No. 10 2013 208 549.4 filed May 8, 2013, the entire content of which is hereby incorporated by reference.

FIELD OF THE INVENTION

The invention relates to an illumination device comprising a pump light source and a phosphor wheel for converting at least a part of the pump light into conversion light.

Such an illumination device may, in particular, be used as a light-generating unit in a projector, for example for video projectors or data projectors.

BACKGROUND OF THE INVENTION

Illumination devices for projection applications, which have a phosphor wheel comprising one or more phosphor substances, are known from the prior art, for example from the document US 2010/0245777 A1. These illumination devices comprise a pump light source, which excites the phosphor to emit light with a wavelength different to the pump light wavelength (wavelength conversion of the pump light by means of phosphor). Conventionally, the phosphors are arranged successively in the rotation direction of the phosphor wheel, so that the light (conversion light) emitted by the respective phosphor is generated and delivered to the imaging system in temporal succession.

Lasers, for example laser diodes, are preferably used as the pump light source. In this case, the technology is also known by the term LARP (Laser Activated Remote Phosphor).

The conversion efficiency of a phosphor (=radiation power of the conversion light relative to the radiation power of the pump light) is dependent on the temperature of the phosphor and therefore on the intensity of the pump light on the phosphor. With increasing temperature and intensity, the conversion efficiency of the phosphor decreases. Since the temperature distribution of a phosphor is also dependent on the intensity distribution of the pump light on this phosphor, there is in principle at least an indirect dependency of the conversion efficiency of the phosphor on the intensity distribution of the pump light on the phosphor. The decrease in the conversion efficiency of phosphors with increasing phosphor temperature or pump intensity is referred to as quenching.

The light distribution on the phosphor, for example in a LARP projection application, is generally a compromise between the conversion efficiency of the phosphor and the geometrical efficiency of the optical unit which collects the conversion light from the phosphor and makes it ready for the application, also referred to below as a collecting optical unit. The lower the pump light intensity, the higher the phosphor efficiency. With an increase in the area exposed to the pump light on the phosphor (pump light area), on the other hand the efficiency of the collecting optical unit decreases when the image of the pump light area, generated by the collecting optical unit, is increasingly curtailed by an aperture. For this reason, the size of the pump light area is a compromise in order to maximize the overall efficiency (which is the product of the phosphor conversion efficiency and the efficiency of the collecting optical unit).

Different phosphors have different quenching properties. There are therefore different requirements for the pump light distribution on the phosphors, in order to maximize the overall efficiency. If the phosphors are on a planar phosphor wheel, then with a pump light source which is invariant as a function of time all the phosphors have to date been illuminated with the same pump light distribution. This can entail losses in the overall efficiency of the system, since the product of phosphor conversion efficiency and geometrical efficiency is different for each phosphor on the phosphor wheel.

SUMMARY OF THE INVENTION

It is an object of the present invention to at least partially overcome the disadvantages of the prior art, and, in particular, to provide a phosphor wheel for an illumination device, in particular an illumination device for projection applications, which is also suitable for relatively high pump powers, in particular when using phosphors having a conversion efficiency which is reduced at excessively high pump power densities.

This object is achieved in accordance with one aspect of the invention directed to a phosphor wheel for an illumination device, for converting pump light into conversion light, which is configured for rotation about a rotation axis, having a carrier substrate and at least two phosphor regions arranged thereon, wherein a first phosphor region comprises a first phosphor layer comprising a first phosphor for emitting conversion light of a first light color, a second phosphor region comprises a second phosphor layer comprising a second phosphor for emitting conversion light of a second light color, the front surface, intended for exposure to the pump light, of the first phosphor layer is configured in a planar fashion in such a way that the surface defines a first imaginary plane, the front surface, intended for exposure to the pump light, of the second phosphor layer is configured in a planar fashion in such a way that the surface defines a second imaginary plane, and wherein the first plane and the second plane are offset parallel with respect to one another by a distance D.

Different pump light distributions are provided on phosphors having a different dependency of the conversion efficiency, in particular a different pump light power-dependent conversion efficiency. To this end, the phosphor wheel is configured in such a way that at least the front surfaces (that is to say those facing toward the incident pump light radiation) of the various phosphor layers are arranged in different planes with respect to the incident pump light radiation. The front surfaces of the phosphor layers thus form so to speak a kind of relief. The rear surfaces of the phosphors may be formed overall in a planar fashion or alternatively in the manner of a relief; in the latter case, the respective phosphor layers may also be of different thicknesses.

The optical configuration may be carried out in such a way that the pump laser focus lies before, in or behind the front surface of a phosphor. In the latter case, the (imaginary) pump laser focus may, in particular, also lie inside a phosphor layer.

With a corresponding optical configuration, the pump light rays strike, for example, the front surface of one phosphor layer in the focal plane of a focusing optical unit, and the front surface of another phosphor layer before or behind the focal plane. Since the area of a phosphor layer which is exposed to the pump light (=pump light area) increases with the distance from the focal plane (and, within the beam waist, in both directions away from the focal plane), the pump light intensity (=pump light power expressed in terms of the exposed area) on the exposed phosphor layer correspondingly decreases and therefore so does the local heating of the phosphor.

The conversion light is collected and collimated with the aid of an optical unit. When the phosphor conversion takes place in reflection mode, the aforementioned focusing optical unit may be used for this. The conversion light then passes through the optical unit in the opposite direction to the incident pump light. If the phosphor wheel is configured for transmission mode, the collection and collimation of the conversion light is carried out with the aid of a separate collimation optical unit, which is arranged on the other side of the phosphor wheel from the focusing optical unit.

Furthermore, the conversion light, optionally together with a part of the pump light, may be input into an optical integrator for spatial homogenization. To this end, the region of the phosphor shining because of the conversion light emission (conversion light spot), which substantially coincides with the pump beam spot, is imaged into the entry aperture of the optical integrator. In projection applications, imaging ratios of from 2:1 to 4:1 are typical. So that the conversion light emitted from the shining region can be guided efficiently through the integrator aperture, the size of the shining region must be limited to a maximum size. This maximum size corresponds to the area of the image of the optical projection of the integrator aperture on the surface of the phosphor layer. If the pump beam spot, and therefore the light spot, are increased beyond this area, the optical efficiency thus decreases.

On the other hand, in the case of phosphors which exhibit strong quenching, the conversion efficiency increases to a particularly pronounced extent with decreasing pump power. For such phosphors, it may be advantageous to increase the pump beam spot, specifically whenever the increase in the conversion efficiency of the phosphor outweighs the decrease in the optical efficiency. As can be seen from the example represented in FIG. 6, for different phosphors (here red R and yellow Y) there are different compromises for maximizing the output power $P_A$ input into the integrator aperture. Since the red phosphor R quenches more strongly with the pump intensity than the yellow Y, in this case it is advantageous to use a larger pump beam spot diameter Ø. The green-emitting phosphors ("green phosphors") used in the exemplary embodiments below moreover exhibit a similar behavior, in particular quenching behavior, as the yellow phosphor shown in FIG. 6.

The difference between the sizes of the respective pump light spots on the respective front surfaces of two phosphor layers may, inter alia, be influenced by the distance D between the associated imaginary planes. The distance D lies, increasingly preferably in this order, in the range of between 0.1 mm and 2 mm, 0.1 mm and 1 mm, 0.1 mm and 0.5 mm.

The distance D between the front surfaces of two phosphor layers may be produced by applying the two phosphor layers with different thicknesses on a planar or relief-shaped side of the carrier substrate of the phosphor wheel.

The distance D may also be at least partially produced by a spacer layer between the carrier substrate and at least one of the phosphor layers. In particular, the phosphor layers in this embodiment may also be of equal thickness. In this way, it is possible to save on phosphor material.

The distance D between the phosphor surfaces may also be produced by shaping the region of the carrier substrate comprising the first phosphor region and the region of the carrier substrate comprising the second phosphor region in a nonplanar fashion with respect to one another. In particular, the phosphor layers may also be of equal thickness in this embodiment, that is to say the distance D may be produced exclusively by suitable shaping.

In any event, the front surfaces of the phosphor layers do not form a common plane but rather a kind of relief in which the surfaces of the phosphor layers extend in different imaginary planes. Preferably, the imaginary planes extend perpendicularly to the rotation axis of the phosphor wheel.

The regions on the carrier substrate of the phosphor wheel, in which the phosphor layers are arranged, are preferably formed as circular or circular ring-shaped segments.

The object is also achieved by an illumination device comprising at least one phosphor wheel as described above and at least one pump light source, in particular a semiconductor light source, for exposure of the phosphor wheel to pump light which can be wavelength-converted at least partially into conversion light by means of the at least two phosphor regions of the phosphor wheel.

In one refinement, an optical unit is arranged between the pump light source and the phosphor wheel, the optical unit being configured in order, on the one hand, to focus the pump light rays of the pump light source onto the phosphor wheel and, on the other hand, to collect and collimate the conversion light.

Preferably, the optical unit comprises a chromatic objective. The focal lengths of a chromatic objective, which differ for different light wavelengths, are deliberately used for the phosphor layer front surfaces which extend in different planes and consequently are at a different distance from the objective. Preferably, the front surface of that phosphor layer, for the conversion light of which the chromatic objective has a longer focal length than for the conversion light of the other phosphor layer, is arranged further away from the chromatic objective than the front surface of the other phosphor layer by the distance D.

With a view to the efficiency of the collection of the conversion light, the chromatic objective is preferably configured in such a way, and the first phosphor layer is arranged in such a way, that the front surface of the first phosphor layer rotates through the focal point of the chromatic objective for the conversion light of the first phosphor layer during the rotation of the phosphor wheel. Likewise preferably, the front surface of the second phosphor layer rotates through the focal point of the chromatic objective for the conversion light of the second phosphor layer.

For the separation of pump light and conversion light, a dichroic mirror element may be provided between the phosphor wheel and the pump light source, preferably between the focusing and collecting optical unit and the pump light source. In this way, the conversion light coming from the phosphor wheel and propagating counter to the pump light direction in this region is guided in a direction different to the pump light direction.

Furthermore, an optical integrator may be provided for input and spatial homogenization of the conversion light and optionally also of the pump light.

The illumination device described above may, for example, be used in a projector. To this end, the light coming from the optical integrator is guided onto an imaging unit. For sequential generation of the color fields, the imaging unit is synchronized with the phosphor wheel. The color fields are projected onto a projection surface by means of a projection optical unit.

BRIEF DESCRIPTION OF THE DRAWINGS

The invention will be explained in more detail below with the aid of exemplary embodiments. In the figures, schematically.

DETAILED DESCRIPTION OF THE DRAWINGS

In what follows, features which are the same or of the same type may also be provided with the same references for the sake of simplicity.

Figure 1:
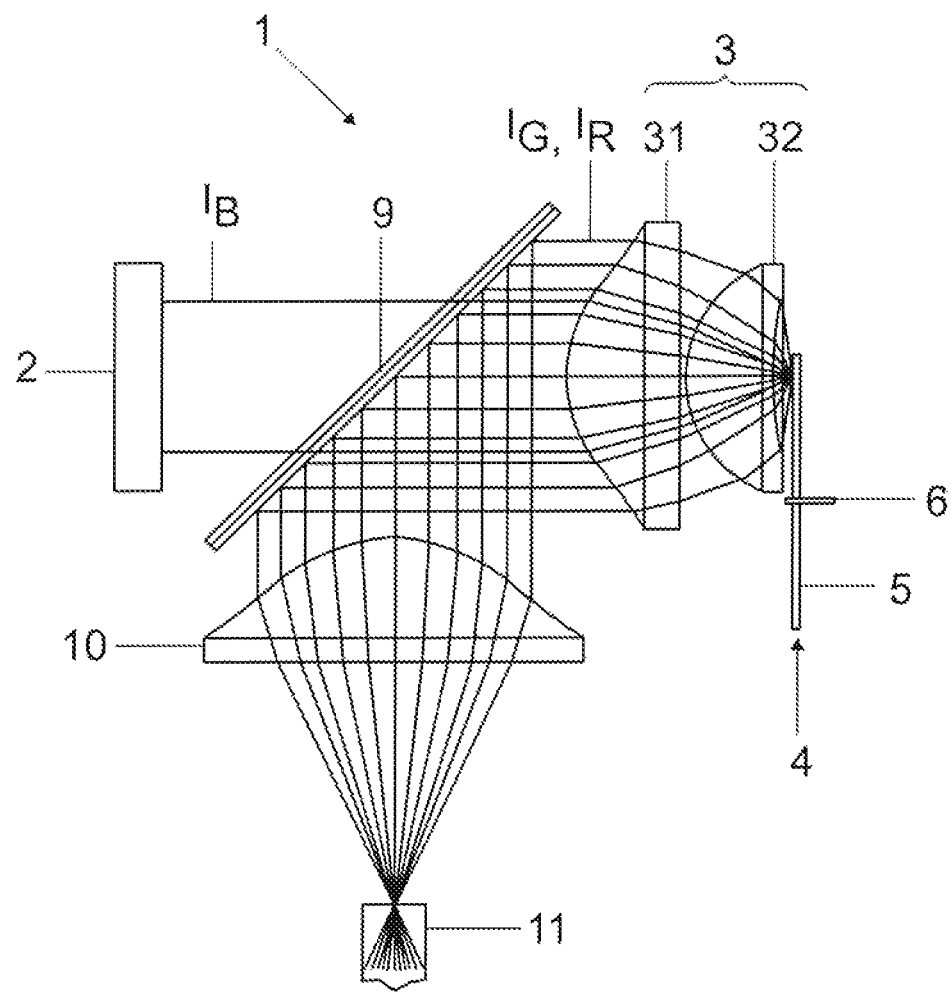
FIG. 1 shows an exemplary embodiment of an illumination device according to the invention, comprising a phosphor wheel according to the invention.

FIG. 1 shows a schematic representation of an illumination device 1 according to one embodiment of the invention.

The illumination device 1 comprises a laser device 2 as a pump light source. The laser device 2 is configured in order to emit laser light in the blue spectral range, since on the one hand this represents a suitable excitation wavelength for most phosphors. On the other hand, this makes it possible to use the unconverted blue laser light as a blue light channel (B), for example for an RGB projection unit. The emission wavelength of the blue laser radiation $I_B$ preferably lies in the range of, for example, about 400-470 nm. The pump light source 2 may, for example, be formed as a laser diode matrix which comprises a multiplicity of laser diodes.

The blue laser light $I_B$ (=pump light) is focused onto a phosphor wheel 4 by means of an optical lens system 3. The phosphor wheel 4 has a circular plate-shaped carrier substrate 5 with a rotation axis 6 arranged perpendicularly and centrally with respect thereto.

Figure 2A:
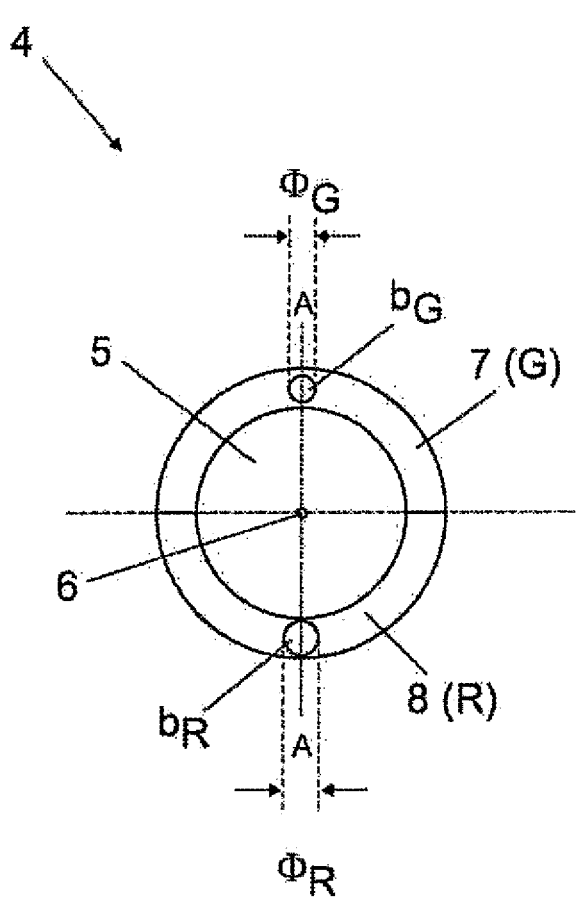
FIGS. 2A and 2B show, respectively, a plan view and a cross section along line AA of the phosphor wheel according to FIG. 1, FIGS. 3A and 3B show, respectively, a plan view of a cross section along line AA of one alternative embodiment of the phosphor wheel.
Figure 2B:
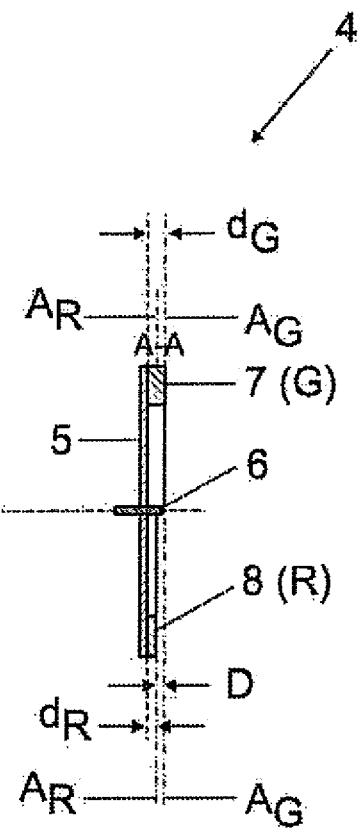

In what follows, reference will now also be made to FIGS. 2a, 2b, which show the phosphor wheel 4 in a schematic representation, respectively in a plan view and in a sectional representation along the section line AA. The plane side, facing toward the laser device 2, of the carrier substrate 5 of the phosphor wheel 4 comprises a circular ring-shaped region, which is subdivided into two semicircular ring-shaped segments. The first segment 7 is coated with a green phosphor G, and the second segment 8 is coated with a red phosphor R. The layer thicknesses d of the two phosphors are different, namely $d_G=250$ μm for the green phosphor G and $d_R=100$ μm for the red phosphor R. The respective surfaces of the green phosphor layer and the red phosphor layer, which face toward the laser device 2 (=front surfaces), thus lie in different imaginary planes $A_G$ and $A_R$ which are at a distance $D=d_G-d_R=150$ μm from one another. For better visibility, the phosphor layers are represented with an exaggerated thickness in FIG. 2b. In FIG. 1, conversely, the phosphor layers cannot be seen on the phosphor wheel 4.

Figure 6:
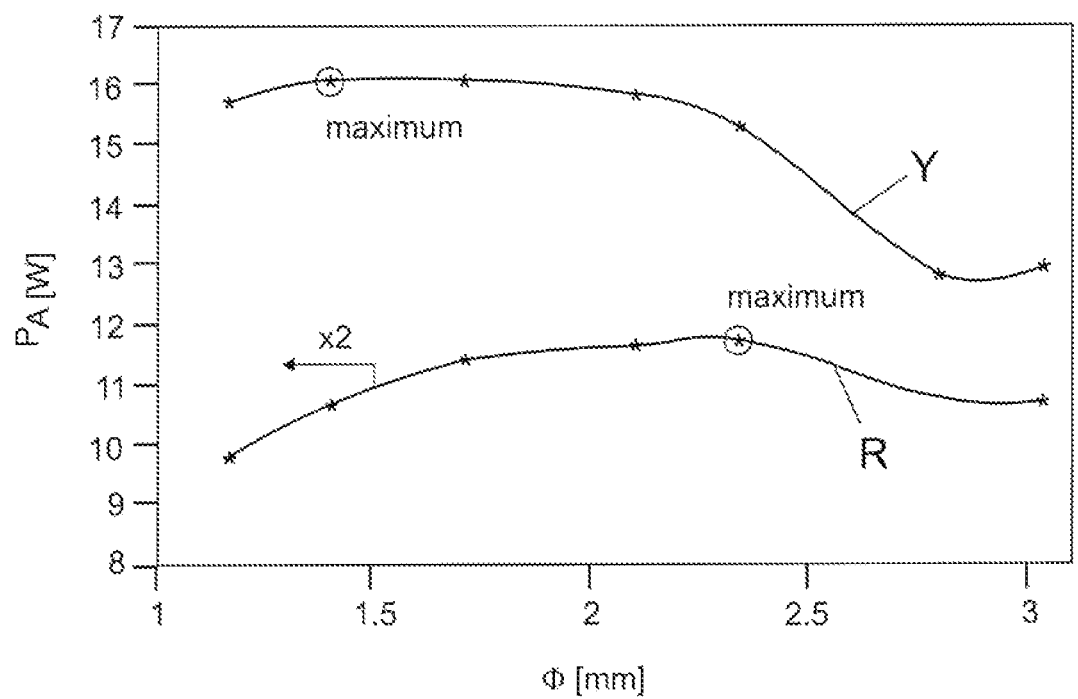
FIG. 6 shows measurement curves of the power input into an optical integrator for yellow and red conversion light as a function of the diameter of the pump light spot on the relevant phosphor layer.

The phosphor wheel may in principle also have more than two phosphor segments, in particular comprising different colored phosphors, for example with an additional yellow phosphor or alternatively additional color nuances, for example different red phosphors. Furthermore, the phosphor wheel may also comprise one or more transmitted light segments, which are transparent at least for the pump light. In this way, for example, a wrap-around branch may be produced for temporally sequential combination of pump light and conversion light (see, for example, FIG. 6 of Document US 2010/0245777 A).

The phosphor wheel 4 is arranged with respect to the optical lens system 3 in such a way that the focal plane for the laser light $I_B$ lies in the plane $A_G$ of the layer of the green phosphor G. Consequently, the front surface of the green phosphor layer 7 rotates through the focal spot $b_G$ of the blue laser light $I_B$. On the front surface of the green phosphor layer 7 (which corresponds to the focal plane), the laser beam thus has the smallest diameter $Ø_G$ (=focal spot). The plane $A_R$ of the layer of the red phosphor R, conversely, lies behind the focal plane by the distance D. The front surface of the red phosphor layer 8 thus rotates through the larger spot $b_R$ of the blue laser light $I_B$ with the spot diameter $Ø_R > Ø_G$. Consequently, the (local) intensity of the laser light on the red phosphor layer R is less than on the green phosphor layer G.

Furthermore, the lens system 3 collects the conversion light (here red and green light) emitted by the respective phosphor R, G within the pump light spot $b_R$, $b_G$, and thus acts as a collecting optical unit for the conversion light. To this end, the lens system 3 is designed as a chromatic objective having the two converging lenses 31, 32. For reasons of efficiency, the chromatic objective 3 is preferably configured in such a way that its focal length difference for red and green light corresponds at least approximately to the distance D between the two planes $A_G$ and $A_R$. Since the focal length for red light is furthermore longer than for green, the chromatic objective 3 collects the red light emitted by the red phosphor layer 8 arranged further away by the distance D, and the green light emitted by the green phosphor layer 7 arranged correspondingly closer, particularly efficiently.

The wavelength-converted colored light (=conversion light) emitted back by the respective phosphor layer R or G rotating past below the pump light spot $b_R$, $b_Q$ is collected and collimated by the chromatic lens system 3 (lens 31 and lens 32), and extracted from the pump light beam path via a dichroic mirror 9 by means of reflection. To this end, the dichroic mirror 9 is arranged between the pump light source 2 and the lens system 3 in a 45° tilted position with respect to the pump light beam path, and the counter-propagating conversion light beam path. Furthermore, although the dichroic mirror 9 is configured in order to transmit light in the blue spectral range (i.e. in particular the blue pump light $I_B$), it is on the other hand configured in order to reflect light in the non-blue spectral range (i.e. in particular the conversion light). In this way, on the one hand the blue pump light $I_B$ can pass through the dichroic mirror 9 onto the phosphor wheel 4, and on the other hand the dichroic mirror 9 extracts the conversion light arriving temporally successively, i.e. green light $I_G$ and red $I_R$ light, perpendicularly out of the pump light beam path. The dichroic mirror 9 is thus used in this case as a wavelength-selective beam deviator, which transmits the pump light and reflects the conversion light. By means of a further focusing lens system 10, the conversion light is, for example, focused into an optical integrator 11 of a projection module.

Depending on the requirement for the geometry of the optical structure, the position of the pump light source 2 may also be interchanged with the output for the extracted light. To this end, it is merely necessary to modify the dichroic mirror in such a way that it reflects the blue pump light $I_B$ and transmits the conversion light. Furthermore, the dichroic mirror may also be arranged with a tilt angle other than 45°.

Figures 3A, 3B:
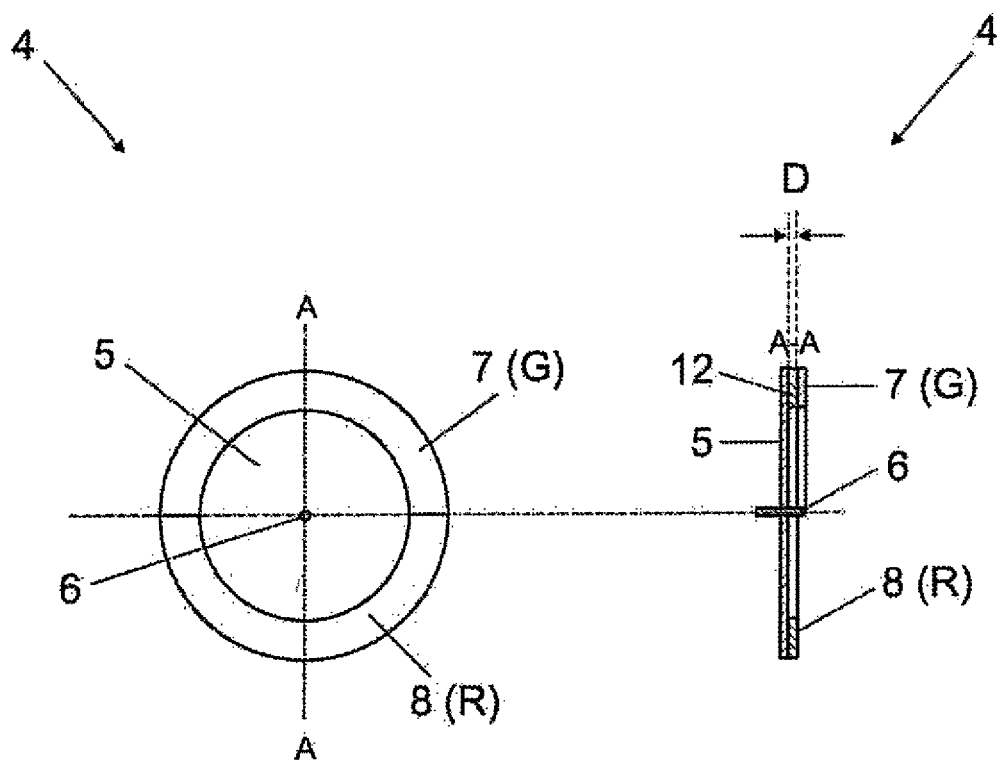

FIGS. 3a, 3b schematically represent an alternative embodiment of the phosphor wheel of FIGS. 2a, 2b. The difference here is that, although the green phosphor layer 7 and the red phosphor layer 8 have the same thickness, a spacer layer 12 of thickness D is arranged between the carrier substrate 5 and the green phosphor layer 7. In this way, it is possible to save on green phosphor G but still arrange the respective surfaces of the green phosphor layer and the red phosphor layer in different imaginary planes separated by the distance D. Preferably, the material for the spacer layer has a high thermal conductivity and low absorption.

Figures 4A, 4B:
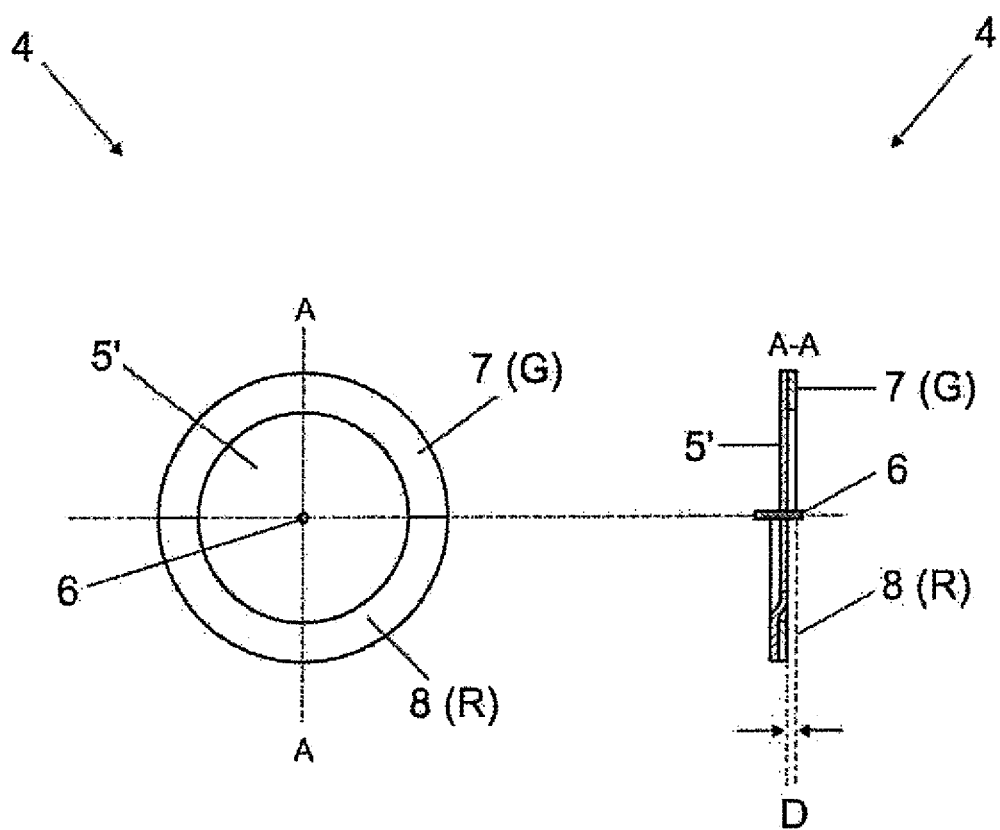
FIGS. 4A and 4B show, respectively, a plan view of a cross section along line AA of another alternative embodiment of the phosphor wheel.

Another alternative embodiment of the phosphor wheel is schematically represented in FIGS. 4a, 4b. In this case, the carrier substrate 5' of the phosphor wheel is formed in such a way that it is offset backward, i.e. away from the pump light source 2, in the semicircular ring-shaped region of the red phosphor layer 8. The remaining part of the carrier substrate 5' is planar, that is to say including the semicircular ring-shaped region on which the green phosphor layer 7 is applied. In this way, the surfaces of the two phosphors R, G are arranged in different imaginary planes separated by the distance D even when the layer thicknesses are the same. An additional spacer layer, as in the previous example, may be obviated here.

Figures 5A, 5B:
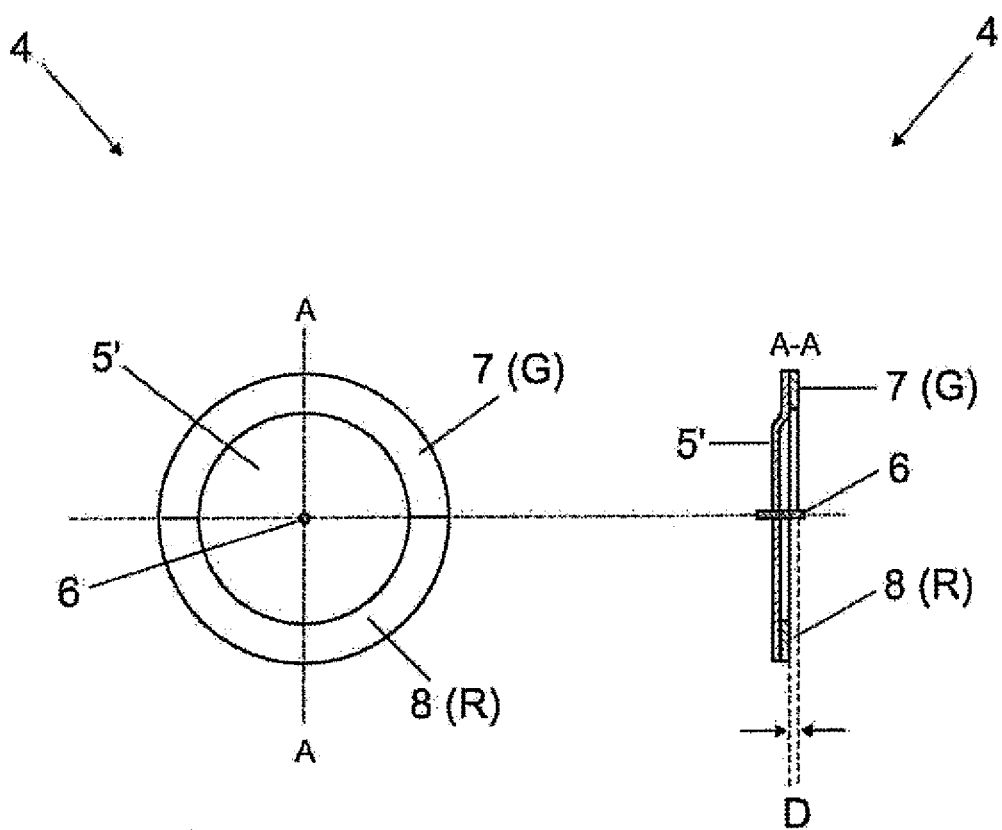
FIGS. 5A and 5B show, respectively, a plan view of a cross section along line AA of yet another alternative embodiment of the phosphor wheel.

Lastly, FIGS. 5a, 5b show a schematic representation of a variant of the previous embodiment of the phosphor wheel. The carrier substrate 5' of the phosphor wheel is formed in the same way. However, in this case it is not that the backwardly offset side of the semicircular ring-shaped configuration is coated with red phosphor 8, but rather that the other, forwardly offset side is coated with green phosphor 7. The semicircular ring-shaped green phosphor layer 7 is applied on the planar region of the carrier substrate 5' of the phosphor wheel. In this way, the front surfaces of the two equally thick phosphor layers 7, 8 are likewise arranged in different imaginary planes separated by the distance D.

Embodiments of the invention provide an illumination device comprising a pump light source and a phosphor wheel. The phosphor wheel comprises at least two segmented phosphor layers. The front surfaces of the phosphor layers do not form a common plane, but instead a kind of relief in which the surfaces of the phosphor layers extend in different imaginary planes. When the phosphor wheel rotates through a beam waist of the pump light, in this way the size of the pump light spot and therefore also the power density distribution of the pump light on the respective phosphor layer are adapted.

The invention claimed is:

1. A phosphor wheel for an illumination device, for converting pump light into conversion light, which is configured for rotation about a rotation axis, having a carrier substrate and at least two phosphor regions arranged thereon,
    wherein a first phosphor region comprises a first phosphor layer comprising a first phosphor for emitting conversion light of a first light color,
    wherein a second phosphor region comprises a second phosphor layer comprising a second phosphor for emitting conversion light of a second light color,
    wherein a front surface, arranged for exposure to the pump light, of the first phosphor layer is configured in a planar fashion in such a way that the front surface of the first phosphor layer lies in a first imaginary plane,
    wherein a front surface, arranged for exposure to the pump light, of the second phosphor layer is configured in a planar fashion in such a way that the front surface of the second phosphor layer lies in a second imaginary plane, and
    wherein the first imaginary plane and the second imaginary plane are parallel to one another and are separated from one another by a non-zero distance D.

2. The phosphor wheel of claim 1, wherein the two imaginary planes are perpendicular to the rotation axis of the phosphor wheel.

3. The phosphor wheel of claim 1, wherein the distance D lies in the range of between 0.1 mm and 2 mm.

4. The phosphor wheel of claim 1, wherein the first phosphor layer and the second phosphor layer are configured with different thicknesses.

5. The phosphor wheel of claim 1, further comprising a spacer layer between the carrier substrate and at least one of the phosphor layers.

6. The phosphor wheel of claim 1, wherein the region of the carrier substrate comprising the first phosphor region and the region of the carrier substrate comprising the second phosphor region are shaped in a nonplanar fashion with respect to one another.

7. The phosphor wheel as claimed in claim 1, wherein the phosphor regions are formed as circular or circular ring-shaped segments.

8. An illumination device comprising at least one phosphor wheel of claim 1 and at least one pump light source for exposure of the phosphor wheel to pump light ($I_B$) which can be wavelength-converted at least partially into conversion light by the at least two phosphor regions of the phosphor wheel.

9. The illumination device of claim 8, further comprising an optical unit which is arranged between the pump light source and the phosphor wheel, the optical unit being configured to focus the pump light rays ($I_B$) of the pump light source onto the phosphor wheel and to collect and collimate the conversion light ($I_G$, $I_R$).

10. The illumination device of claim 9, wherein the optical unit comprises a chromatic objective, and wherein the front surface of that phosphor layer, for the conversion light of which the chromatic objective has a longer focal length than for the conversion light of the other phosphor layer, is arranged further away from the chromatic objective than the front surface of the other phosphor layer by the distance D.

11. The illumination device of claim 8, wherein the chromatic objective is configured in such a way, and the first phosphor layer is arranged in such a way, that the front surface of the first phosphor layer rotates through the focal point of the chromatic objective for the conversion light of the first phosphor layer during the rotation of the phosphor wheel.

12. The illumination device of claim 8, wherein the chromatic objective is configured in such a way, and the second phosphor layer is arranged in such a way, that the front surface of the second phosphor layer rotates through the focal point of the chromatic objective for the conversion light of the second phosphor layer during the rotation of the phosphor wheel.

13. The illumination device of claim 8, further comprising a dichroic mirror element between the phosphor wheel and the pump light source configured to separate pump light and conversion light.

14. The illumination device of claim 8, further comprising an optical integrator for input of the conversion light.

15. A projector comprising the phosphor wheel of claim 1.

16. The phosphor wheel of claim 1 or 2, wherein the distance D lies in the range of between 0.1 mm and 2 mm.

17. The phosphor wheel of claim 16, wherein the distance D lies in the range of between 0.1 mm and 1 mm.

18. An illumination device comprising at least the phosphor wheel of one of the preceding claims and at least one pump light source, in particular a semiconductor light source, for exposure of the phosphor wheel to pump light which can be wavelength-converted at least partially into conversion light by means of the at least two phosphor regions of the phosphor wheel.

19. A projector comprising the illumination device of claim 8.

20. The illumination device of claim 14, wherein the optical integrator further receives the pump light.

21. The phosphor wheel of claim 17, wherein the distance D lies in the range of between 0.1 mm and 0.5 mm.

* * * * *